June 10, 1930.  G. J. CROSMAN, JR  1,762,679
HANDLE FOR TOOLS
Filed Jan. 19, 1929

INVENTOR.
George J. Crosman Jr.
BY
Mason, Fenwick & Lawrence
ATTORNEYS

Patented June 10, 1930

1,762,679

UNITED STATES PATENT OFFICE

GEORGE JOHN CROSMAN, JR., OF NEWARK, NEW JERSEY

HANDLE FOR TOOLS

Application filed January 19, 1929. Serial No. 333,583.

My invention relates to that class of tool handles in the application of which the shank of the tool is provided with irregularities and the plastic material forming the handle is molded upon the shank so that when the handle material hardens around the irregularities of the shank, the shank is effectually prevented from any longitudinal or lateral movement in the handle.

Among the objects of my invention are to prevent the handle from being split or broken by any strain on the tool, to improve the security of the tool against movement in the handle and to simplify, strengthen and generally improve the construction of the tool and its handle.

To this end, my invention consists primarily of any implement whose shank is provided with openings through which the plastic material of the handle flows or is pressed in the process of molding and unites the opposite sides of the handle, so that when the material of the handle is hardened the implement will be effectually prevented from splitting or breaking under strain.

My invention also consists in forming the shank of the implement of a flattened extension thereof to opposite sides of which are riveted metallic strips which are pressed outward to form the openings or the other locking irregularities such as transverse ribs.

In order that my invention may be fully understood, I shall first describe in detail the mode in which I at present prefer to carry the invention into effect and then particularly point out the invention in the claim.

Reference is to be had to the accompanying drawings forming part of this application, in which like parts are designated by the same numerals in all the figures.

Figure 1:
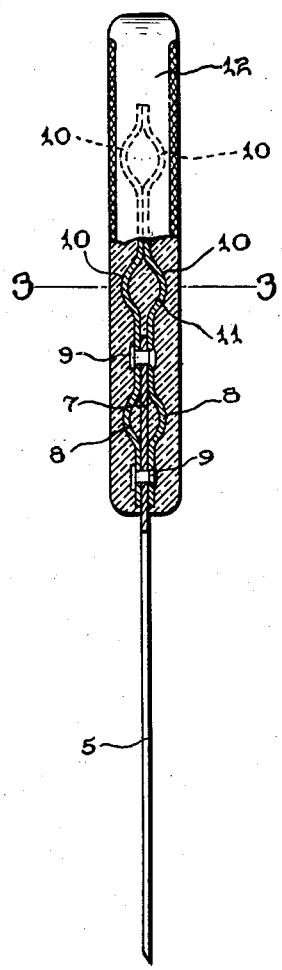
Figure 1 is a side partly broken view of a putty knife for example, having a handle embodying my invention.
Figure 2:
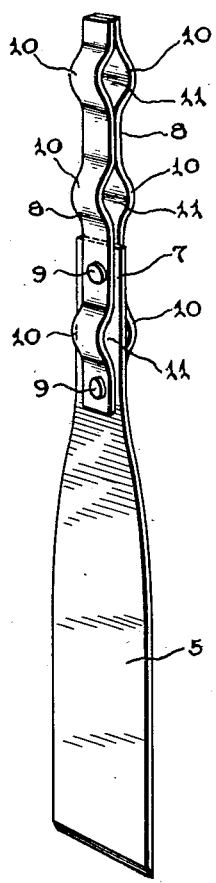
Figure 2 is a perspective view of the same before the handle is applied.
Figure 3:
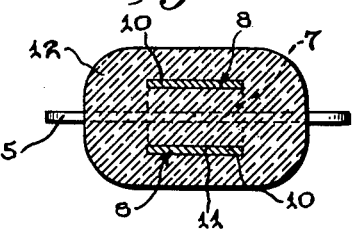
Figure 3 is a cross sectional view of same on the line 3—3, Figure 1.

In Figures 1, 2, and 3, the number 5 designates the blade of a putty knife selected as one species of implement to illustrate one form of my invention. To apply a handle to said tool according to this form of my invention, I form the blade with a flattened axial extension 7, and secure to opposite sides of said extension 7, flat metallic strips 8, by rivets 9, passing through both strips 8 and the intervening extension 7. The strips 8 preferably project beyond the end of the extension 7 and are formed with a plurality of outwardly pressed bows 10, forming therebetween transverse openings 11, one of which embraces the extension as shown.

The handle 12 is made of any suitable material, such as a hot or cold molded product or a phenol condensation product, which is plastic for molding and hardens when molded and I prefer to use an electrical insulating material to avoid electric shocks when the implement is designed for use in connection with electrical apparatus.

The opposite parts of the handle 12, when plastic are pressed upon opposite sides of the implement shank formed by the extension 7 and opposite strips 8, so as to unite the opposite parts of the handle on both sides of the shank and through the openings 11, in the same.

The handle when hardened will thus be effectually prevented from splitting or breaking and the tool from moving in any direction in the handle.

Figure 4:
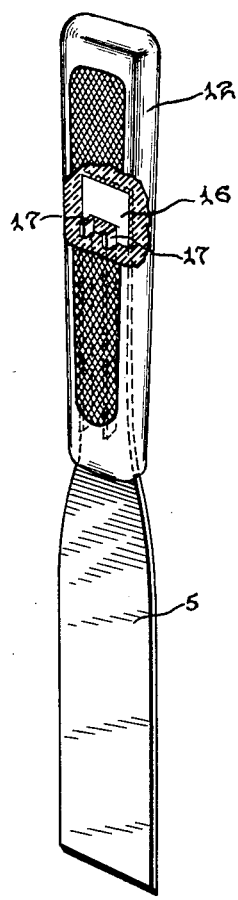
Figure 4 is a broken perspective view of a putty knife, showing a modification form of my invention.

In Figure 4, I have illustrated a modification of my invention in which an opening 16 is pressed through the shank of the implement and the metal along the edges of said opening pressed upward to form ribs 17, so that the plastic material of the handle when molded and hardened through the opening 16 and around the ribs 17, will effectually retain the shank of the implement from movement therein, and will itself be prevented from splitting or breaking under strain.

It is evident that my invention may be applied to any form of tool, cutlery or implement and that many changes may be made in the details of my invention without departing from the boundaries thereof as defined by the following claim.

I claim as my invention:

An implement whose handle is formed of a metallic shank which is an extension of the implement proper and metallic strips whose ends are united to opposite sides of the extension, the strips being pressed oppositely outward to form a plurality of outwardly convex bows, and material molded around said shank to a union between opposite bows.

In testimony whereof I affix my signature.

GEORGE JOHN CROSMAN, Jr.